(12) United States Patent
Vaselaar et al.

(10) Patent No.: US 9,771,953 B1
(45) Date of Patent: Sep. 26, 2017

(54) MIST BLOWER WITH VENTURI HOUSING

(71) Applicants: Cory A. Vaselaar, Sheldon, IA (US); Craig G. Broyhill, Dakota City, NE (US)

(72) Inventors: Cory A. Vaselaar, Sheldon, IA (US); Craig G. Broyhill, Dakota City, NE (US)

( * ) Notice: Subject to any disclaimer, the term of this patent is extended or adjusted under 35 U.S.C. 154(b) by 0 days.

(21) Appl. No.: 15/165,114

(22) Filed: May 26, 2016

(51) Int. Cl.
| | | |
|---|---|---|
| *A01M 7/00* | (2006.01) | |
| *F04F 5/20* | (2006.01) | |
| *B05B 7/00* | (2006.01) | |
| *A01K 13/00* | (2006.01) | |
| *A01M 21/04* | (2006.01) | |
| *B01F 3/04* | (2006.01) | |

(52) U.S. Cl.
CPC .............. *F04F 5/20* (2013.01); *A01K 13/003* (2013.01); *A01M 7/0014* (2013.01); *A01M 21/043* (2013.01); *B01F 3/04063* (2013.01); *B05B 7/0075* (2013.01); *B05B 7/0087* (2013.01); *B01F 2215/0009* (2013.01)

(58) Field of Classification Search
CPC ... B05B 7/0075; B05B 7/0087; B05B 7/0416; B05B 1/005; B05B 7/066; A01M 7/0014; A01M 21/043; A01K 13/003; B01F 3/04063; B01F 2215/0009
USPC ................................ 239/419.5, 434; 406/102
See application file for complete search history.

(56) References Cited

U.S. PATENT DOCUMENTS

| | | | | | |
|---|---|---|---|---|---|
| 2,321,792 | A * | 6/1943 | Bowie | ................. | A01M 7/0014 239/389 |
| 2,745,210 | A * | 5/1956 | Hild | .................... | A01M 7/0014 239/424 |
| 3,980,232 | A * | 9/1976 | Funk | .................... | A01M 7/0014 239/561 |
| 4,709,860 | A * | 12/1987 | Patrick | ................... | A01C 15/04 239/336 |
| 5,269,461 | A * | 12/1993 | Davis | ................. | A01M 7/0014 239/291 |
| 5,996,904 | A * | 12/1999 | Smeraldi | ............. | A01M 7/0014 239/172 |
| 6,318,642 | B1 * | 11/2001 | Goenka | ................... | B05B 7/025 239/290 |

* cited by examiner

*Primary Examiner* — Arthur O Hall
*Assistant Examiner* — Tuongminh Pham
(74) *Attorney, Agent, or Firm* — Dennis L. Thomte; Thomte Patent Law Office LLC

(57) ABSTRACT

A mist blower with a Venturi housing for spraying water or chemicals onto objects such as livestock, orchards, weed areas or the like. The mist blower includes an air blower having an air discharge opening formed therein. A Venturi housing has its inner end in communication with the air discharge opening. An air discharge housing has its inner end embracing the outer end of the Venturi thereby creating a Venturi gap therebetween. The Venturi housing has a plurality of Venturi openings formed therein. As air is blown through the Venturi housing, the Venturi openings draw additional air into the air being discharged. As air is blown through the air discharge housing, additional air is drawn into the air discharge housing by way of the Venturi gap.

7 Claims, 5 Drawing Sheets

MIST BLOWER WITH VENTURI HOUSING

BACKGROUND OF THE INVENTION

Field of the Invention

This invention relates to a mist blower for applying chemicals onto animals, trees in an orchard, weeds in ditches, etc. More particularly this invention relates to a mist blower having a Venturi housing which is employed therewith to increase the volume of misted air being discharged from the mist blower which may be mounted on a tractor, UN, ATV, trailer, etc.

Description of the Related Art

Mist blowers have long been used to: (1) spray animals to kill insets thereon; (2) spray weeds in ditches or the like to kill the weeds; (3) spray trees in an orchard to kill insects on the trees thereof, etc. Sometimes, the mist blower may be used to spray water on cattle or the like to cool them. Usually, the mist blowers of the prior art include a mobile frame onto which is mounted a blower housing having an air intake side and an air discharge end. The air output of the blower is limited by the power source for operating the blower and the size of the air inlet opening of the blower. The prior art solutions to the above shortcomings of the prior art mist blowers is to greatly increase the size of the blower or to increase the size of the power source, both of which increase the cost of the mist blower.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A mist blower is disclosed for applying insecticides, herbicides, pesticides, etc., onto objects such as animals, weeds, trees, etc. The mist blower of this invention includes a mobile frame which may be easily mounted to a three-point hitch of a tractor or which may be mounted on a trailer, ATV, UTV, or the like. The mist blower may be either powered by the PTO of the tractor or by a separate engine secured to the mist blower.

The mist blower of this invention includes a centrifugal blower which is mounted on a mobile frame with the blower including a blower housing having a forward end, a rearward end, and a circular side wall. The blower housing has an air inlet opening at both sides of the blower housing. The blower housing has a horizontally extending and rectangular-shaped air discharge opening formed therein. The air discharge opening has a flange extending therearound. The blower housing is horizontally disposed between the forward and rearward frames of the mobile frame. A Venturi housing is secured to the flange of the air discharge opening which extends around the air discharge opening of the blower housing so as to be in communication with the air discharge opening of the blower housing. The Venturi housing includes first, second, third and fourth wall members which define an open inner end and an open outer end. Each of the wall members of the Venturi housing has a semi-circular Venturi opening formed therein at the outer end thereof. The mist blower of this invention also includes an air discharge housing which includes first, second, third and fourth wall members which define an open inner end and an open outer end. The open inner end of the air discharge housing embraces the outer end of the Venturi housing. The inner end of the air discharge housing has a larger diameter than the diameter of the outer end of the Venturi housing thereby creating an air gap therebetween.

As air is blown through the Venturi housing, the Venturi openings thereof create a Venturi action which draws air into the interior of the Venturi housing thereby providing a larger volume of air being discharged therefrom into the air discharge housing. As the air is being discharged from the outer end of the Venturi housing into the inner end of the air discharge housing, a Venturi effect is created to draw additional air into the air gap between the Venturi housing and the air discharge housing to draw further air into the air discharge housing. The air discharge housing also includes a plurality of injector or spray nozzles which are positioned near the outer ends of the wall members of the air discharge housing. The spray nozzles inject insecticides, herbicides, pesticides, etc., into the air being blown through the air discharge housing.

It is therefore a principal object of the invention to provide an improved mist blower.

A further object of the invention is to provide a mist blower of the type described which increases the volume of air being discharged from the mist blower of this invention.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
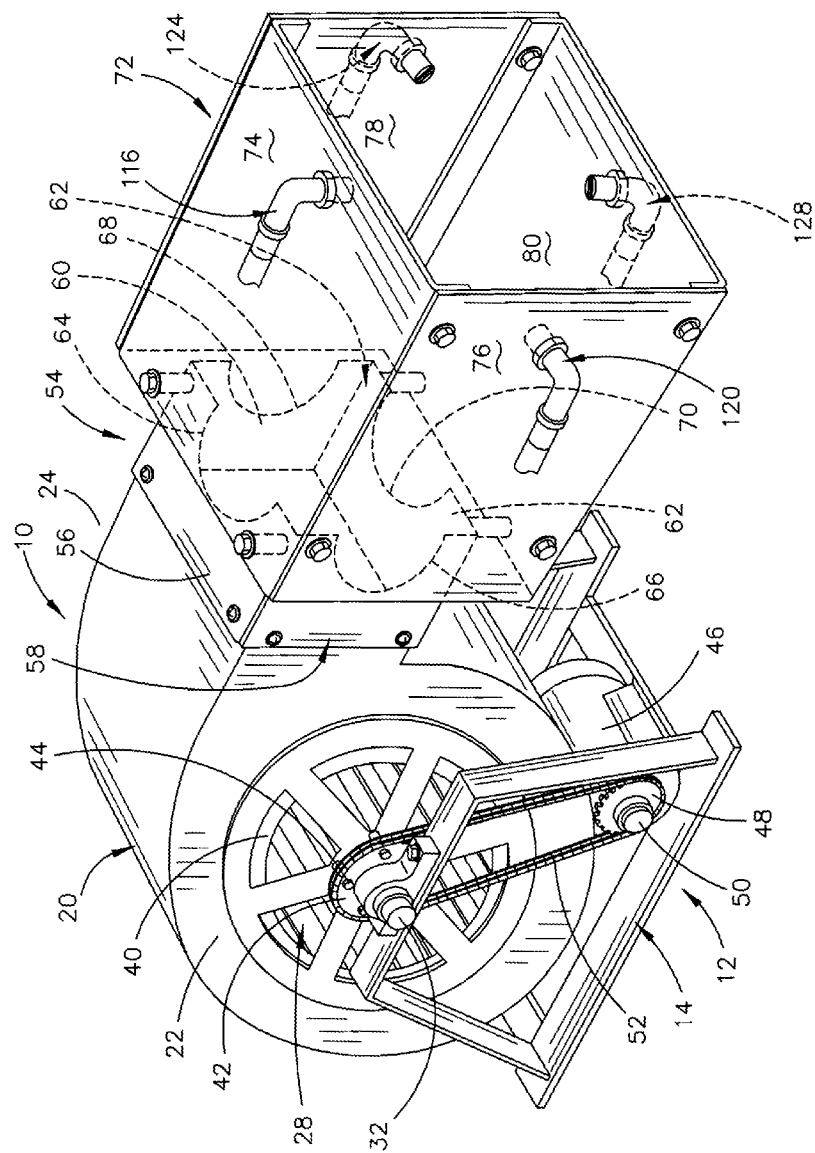
FIG. 1 is a perspective view of the mist blower of this invention.
Figure 2:
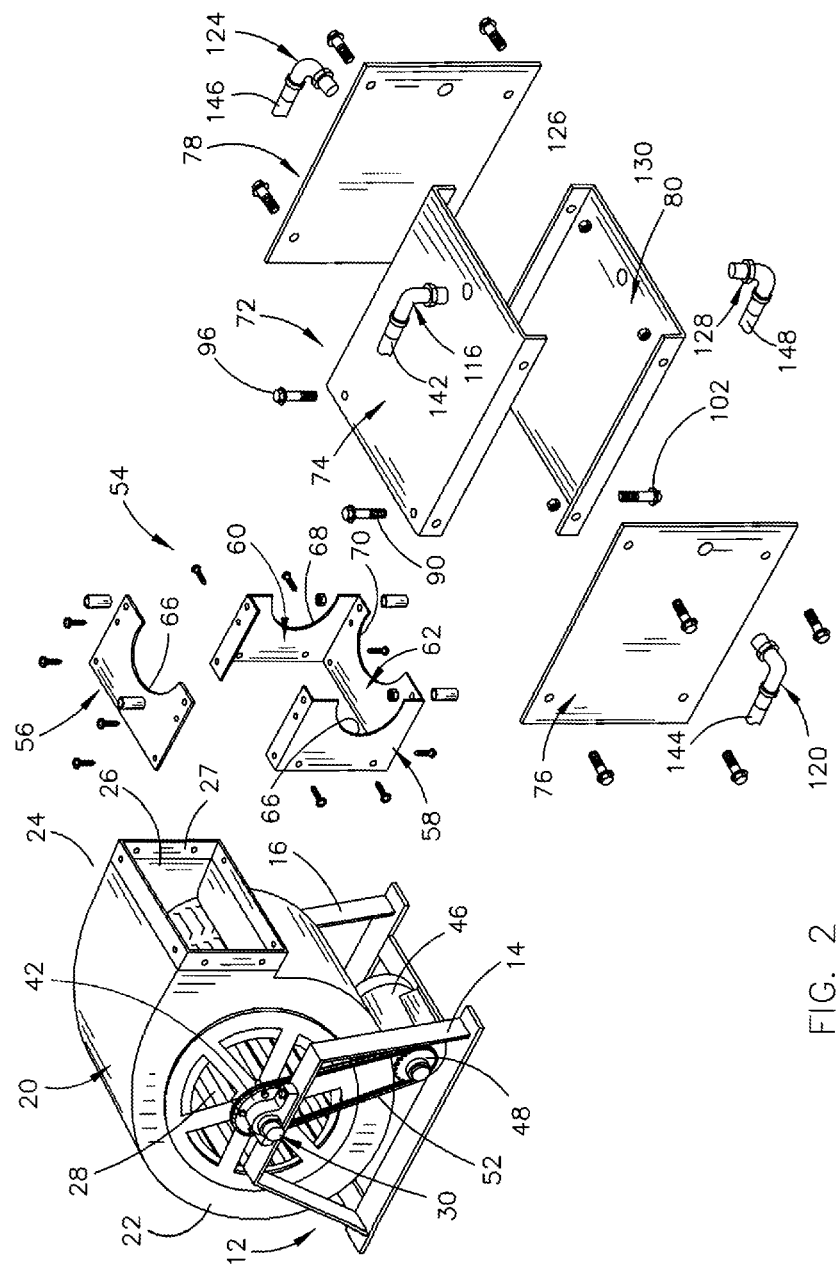
FIG. 2 is an exploded perspective view of the mist blower of this invention.
Figure 3:
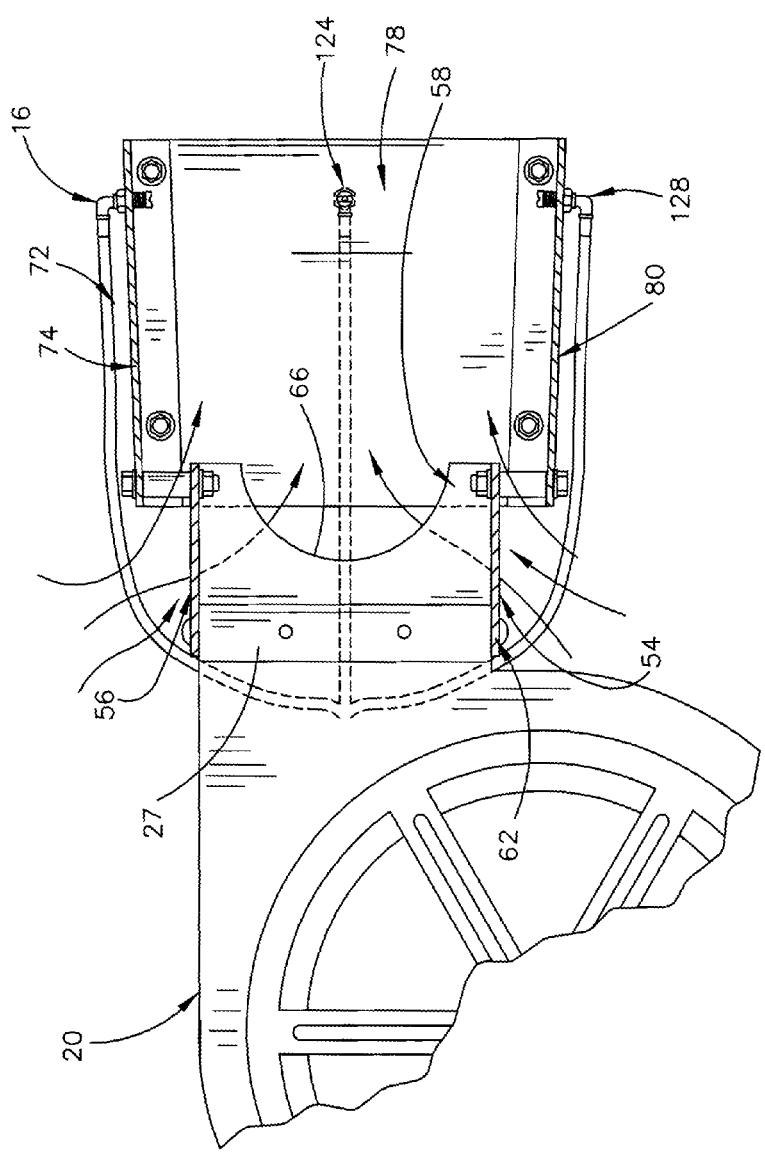
FIG. 3 is a partial sectional view of the mist blower of this invention.
Figure 4:
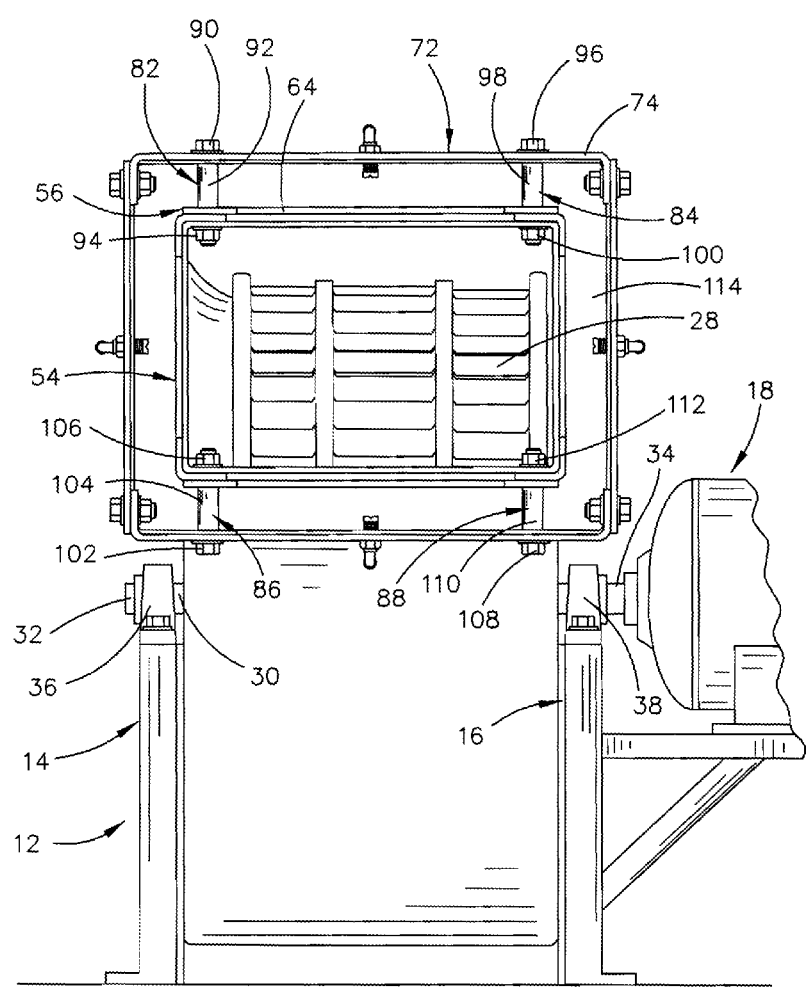
FIG. 4 is a partial end view of the mist blower of this invention.
Figure 5:
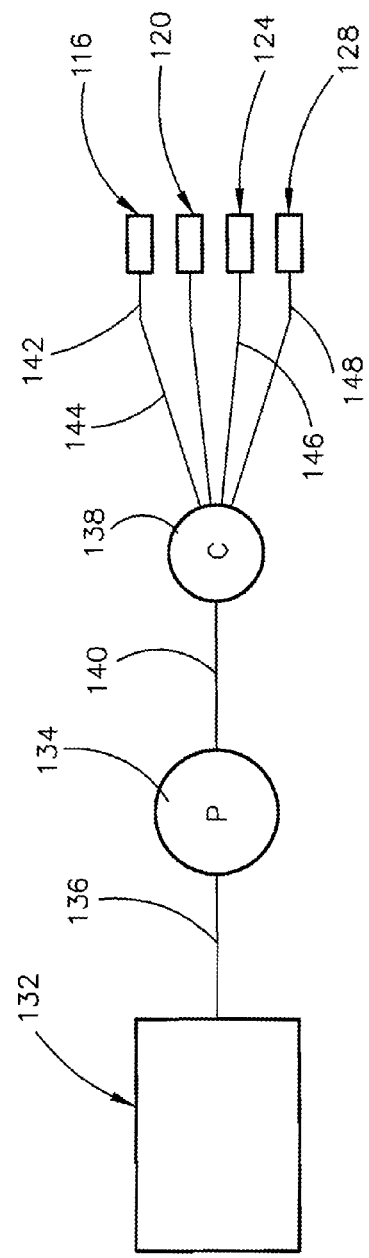
FIG. 5 is a schematic view of a portion of the invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The mist blower of this invention is designated by the reference numeral 10. Blower 10 is mounted on a mobile frame 12 including upstanding frame members 14 and 16. Frame 12 may be mounted to a three-point hitch of a tractor so that the mist blower 10 may be driven by the tractor PTO. The frame 12 could be mounted on an ATV, UTV, etc., or mounted on a trailer. Blower 10 could be powered by engine or electric motor 18 as will be described hereinafter.

Blower 10 includes a blower housing 20 having ends 22 and 24 and a rectangular air discharge opening 26 formed therein. A flange 27 extends around the discharge opening 26. A centrifugal fan 28 or blower wheel is rotatably positioned within housing 20 which includes a horizontally disposed drive shaft 30 having ends 32 and 34 which are rotatably mounted in bearings 36 and 38 respectively which are secured to the upper ends of frame members 14 and 16 respectively. End 22 of housing 20 has an air inlet opening 40 formed therein.

A sprocket 42 is secured to end 22 of housing 20 by bolts 44. A motor 46 is secured to frame 14 and has a sprocket 48 secured to the drive shaft 50 of motor 46. A chain 52 extends around sprockets 48 and 42 to enable blower housing 20 to be rotated with respect to frame members 14 and 16 to enable air to be discharged from blower 10 in different directions.

The numeral 54 refers to a Venturi housing which includes an upper housing member 56, a first side housing member 58, a second side housing member 60 and a lower housing member 62. The housing 54 may be constructed of plastic or metal. The housing members 56, 58, 60 and 62 may be bolted together and secured together by any convenient means. The outer ends of housing members 56, 58, 60 and 62 have semi-circular Venturi openings 64, 66, 68 and 70 formed therein respectively.

The numeral 72 refers to an air discharge housing which is comprised of an upper housing member 74, a first side housing member 76, a second side housing member 78, and a lower housing member 80. Housing members 74, 76, 78 and 80 may be constructed of plastic or metal material. Housing members 74, 76, 78 and 80 may be joined together by bolts or any other conventional means. As seen, it is preferred that the housing members 74, 76, 78 and 80 extend slightly outwardly from their inner ends to their outer ends so that the diameter of the outer end of housing 72 is larger than the inner diameter of housing 72.

Air discharge housing 72 has a larger height and width (diameter) than the height and width (diameter) of Venturi housing 54. The inner end of housing 72 receives the outer end of Venturi housing 54. Spacer bolt assemblies 82, 84, 86 and 88 secure the inner end of housing 72 to the outer end of housing 56 as seen in the drawings.

Spacer bolt assembly 82 includes a bolt 90, spacer tube 92 and nut 94. Spacer bolt assembly 84 includes a bolt 96, spacer tube 98 and nut 100. Spacer bolt assembly 86 includes a bolt 102, spacer tube 104 and nut 106. Spacer bolt assembly 88 includes a bolt 108, spacer tube 110 and nut 112.

Since housing 72 has a height and width greater than the height and width of housing 56, a gap 114 is created between the inner side of housing 72 and the outer side of housing 54.

A conventional spray nozzle 116 extends inwardly through opening 118 in upper housing member 74 and a conventional spray nozzle 120 extends inwardly through opening 122 in first side housing member 76. A conventional spray nozzle 124 extends inwardly through opening 126 formed in second side housing member 78 and a conventional spray nozzle 128 extends inwardly through opening 130 in lower housing member 80.

The numeral 132 refers to a tank or the like containing liquid chemicals. If only a water mist is being sprayed onto animals to cool them, the tank 132 will contain water. Tank 132 is connected to a power driven pump 134 by a hose, conduit or pipe 136. The discharge side of pump 134 is fluidly connected to a controller 138 by a hose, conduit or pipe 140. Controller 138 is individually fluidly connected to spray nozzles 116, 120, 124 and 128 by hoses 142, 144, 146 and 148 respectively. Controller 138 is configured to selectively individually provide chemicals to each of the spray nozzles.

Thus, when it is desired to spray water or chemicals from the air discharge housing 72, the blower housing 20 is rotated with respect to the frame members 14 and 16 by the motor 46 so that the discharge opening 26, the Venturi housing 54 and air discharge housing are facing in the desired direction. The mist blower 10 will then be moved with respect to the articles to be sprayed by the tractor, ATV, UTV, Etc. The motor 18 will then be activated to rotate the fan or blower wheel 28 so that air is directed from the air discharge opening 26 into Venturi housing 54 and into air discharge housing 72. The pump 134 will be activated so that pump 134 will discharge liquid from the discharge side of the pump 134 to the controller 138. The controller may direct the chemical to all the spray nozzles 116, 120, 124 and 128 or to any one of the spray nozzles. The spray nozzles 116, 120, 124 and 128 spray the chemical into the air passing through the air discharge housing 72 to create a chemical mist which is blown onto the article or articles being sprayed.

An important part of the invention is the Venturi openings 64, 66, 68 and 70. As the air is blown through the Venturi housing 56, a Venturi effect is created at the Venturi openings 64, 66, 68 and 70 thereby drawing additional air into the system as seen in FIG. 3. Additionally, as the air is blown from the Venturi housing 54 into the air discharge housing 72, a Venturi effect is created so that additional air is drawn into the system by way of the gap 114 hereby increasing the volume of air being discharged from the blower. Although it is preferred that both the Venturi openings 64, 66, 68 and 70 and the gap 114 be utilized, it may be possible to use either the Venturi openings 64, 66, 68 and 70 or the gap 114.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A mist blower, comprising:

a mobile frame including forward and rearward upstanding and horizontally spaced-apart support frames having upper ends;

a powered centrifugal blower mounted on said upper ends of said forward and rearward support frames;

said blower including a blower housing having a forward end, a rearward end, and a circular side wall;

said side wall of said blower housing having a horizontally extending and rectangular-shaped air discharge opening formed therein;

said blower housing being horizontally disposed between said forward and rearward support frames;

a Venturi housing including:

(a) a first wall member having an inner end, an outer end, a first end and a second end;

(b) a second wall member having an inner end, an outer end, a first end and a second end;
(c) said second wall member extending transversely from said first end of said first wall member;
(d) a third wall member having an inner end, an outer end, a first end and a second end;
(e) said third wall member extending transversely from said second end of said first wall member;
(f) a fourth wall member having an inner end, an outer end, a first end and a second end;
(g) said first end of said fourth wall member being secured to said second end of said second wall member;
(h) said second end of said fourth wall member being secured to said second end of said third wall member;
(i) said inner ends of said first, second, third and fourth wall members defining an open inner end of said Venturi housing;
(j) said outer ends of said first, second, third and fourth wall members defining an open outer end of said Venturi housing;
(k) said inner end of said Venturi housing being secured to said side wall of said fan housing so that said open inner end of said Venturi housing is in communication with said air discharge opening;
(l) at least two of said first, second, third and fourth wall members having a Venturi opening formed therein;
an air discharge housing including:
  (a) a first wall member having an inner end, an outer end, a first end, and a second end;
  (b) a second wall member having an inner end, an outer end, a first end and a second end;
  (c) said second wall member of said air discharge housing extending transversely from said first end of said first wall member of said air discharge housing;
  (d) a third wall member having an inner end, an outer end, a first end and a second end;
  (e) said third wall member of said air discharge housing extending transversely from said second end of said first wall member of said air discharge housing;
  (f) a fourth wall member having an inner end, an outer end, a first end and a second end;
  (g) said first end of said fourth wall member of said air discharge housing being secured to said second end of said second wall member of said air discharge housing;
  (h) said second end of said fourth wall member of said air discharge housing being secured to said second end of said third wall member of said air discharge housing;
  (i) said inner ends of said first, second, third and fourth wall members of said air discharge housing defining an open inner end of said air discharge housing;
  (j) said outer ends of said first, second, third and fourth wall member of said air discharge housing defining an open outer end of said air discharge housing;
said open inner end of said air discharge housing being larger than said open outer end of said Venturi housing;
said open outer end of said Venturi housing being received by said open inner end of said air discharge housing;
said Venturi housing and said air discharge housing being secured together whereby said outer ends of said first, second, third and fourth wall members of said Venturi housing are spaced from said inner ends of said first, second, third and fourth wall members of said air discharge housing respectively to create Venturi air inlet gaps therebetween;
and a spray nozzle positioned within said air discharge housing at the outer ends of at least two of said first, second, third and fourth wall members thereof;
said spray nozzle being connected to a source of liquid chemical under pressure.

2. The mist blower of claim 1 wherein each of said first, second, third and fourth wall members of said Venturi housing have a Venturi opening formed therein.

3. The mist blower of claim 1 wherein a spray nozzle is positioned within each of said first, second, third and fourth wall members of said air discharge housing.

4. A mist blower, comprising:
a mobile frame including forward and rearward upstanding and horizontally spaced-apart support frames having upper ends;
a powered centrifugal blower mounted on said upper ends of said forward and rearward support frames;
said blower including a blower housing having a forward end, a rearward end, and a circular side wall;
said side wall of said blower housing having a horizontally extending and rectangular-shaped air discharge opening formed therein;
said blower housing being horizontally disposed between said forward and rearward support frames;
a Venturi housing including:
  (a) a first wall member having an inner end, an outer end, a first end and a second end;
  (b) a second wall member having an inner end, an outer end, a first end and a second end;
  (c) said second wall member extending transversely from said first end of said first wall member;
  (d) a third wall member having an inner end, an outer end, a first end and a second end;
  (e) said third wall member extending transversely from said second end of said first wall member;
  (f) a fourth wall member having an inner end, an outer end, a first end and a second end;
  (g) said first end of said fourth wall member being secured to said second end of said second wall member;
  (h) said second end of said fourth wall member being secured to said second end of said third wall member;
  (i) said inner ends of said first, second, third and fourth wall members defining an open inner end of said Venturi housing;
  (j) said outer ends of said first, second, third and fourth wall members defining an open outer end of said Venturi housing;
  (k) said inner end of said Venturi housing being secured to said side wall of said fan housing so that said open inner end of said Venturi housing is in communication with said air discharge opening;
an air discharge housing including:
  (a) a first wall member having an inner end, an outer end, a first end, and a second end;
  (b) a second wall member having an inner end, an outer end, a first end and a second end;
  (c) said second wall member of said air discharge housing extending transversely from said first end of said first wall member of said air discharge housing;
  (d) a third wall member having an inner end, an outer end, a first end and a second end;

(e) said third wall member of said air discharge housing extending transversely from said second end of said first wall member of said air discharge housing;
(f) a fourth wall member having an inner end, an outer end, a first end and a second end;
(g) said first end of said fourth wall member of said air discharge housing being secured to said second end of said second wall member of said air discharge housing;
(h) said second end of said fourth wall member of said air discharge housing being secured to said second end of said third wall member of said air discharge housing;
(i) said inner ends of said first, second, third and fourth wall members of said air discharge housing defining an open inner end of said air discharge housing;
(j) said outer ends of said first, second, third and fourth wall member of said air discharge housing defining an open outer end of said air discharge housing;
said open inner end of said air discharge housing being larger than said open outer end of said Venturi housing;
said open outer end of said Venturi housing being received by said open inner end of said air discharge housing;
said Venturi housing and said air discharge housing being secured together whereby said outer ends of said first, second, third and fourth wall members of said Venturi housing are spaced from said inner ends of said first, second, third and fourth wall members of said air discharge housing respectively to create Venturi air inlet gaps therebetween; and
and a spray nozzle positioned within said air discharge housing at the outer ends of at least two of said first, second, third and fourth wall members thereof.

5. The mist blower of claim 4 wherein said liquid is water.

6. The mist blower of claim 4 wherein said liquid is a liquid chemical.

7. The mist blower of claim 4 wherein said outer ends of each of said first, second, third and fourth wall members of said Venturi housing have a semi-circular Venturi opening formed therein.

\* \* \* \* \*